United States Patent
Yamato et al.

(10) Patent No.: US 9,197,149 B2
(45) Date of Patent: Nov. 24, 2015

(54) MOTOR DRIVE APPARATUS

(71) Applicant: Rohm Co., Ltd., Kyoto (JP)

(72) Inventors: Tetsuo Yamato, Kyoto (JP); Noboru Takizawa, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 98 days.

(21) Appl. No.: 14/097,762

(22) Filed: Dec. 5, 2013

(65) Prior Publication Data

US 2014/0176030 A1   Jun. 26, 2014

(30) Foreign Application Priority Data

Dec. 25, 2012  (JP) .................................. 2012-280987

(51) Int. Cl.
*H02P 5/00* (2006.01)
*H02P 6/20* (2006.01)
*H02P 23/00* (2006.01)
*H02P 6/14* (2006.01)

(52) U.S. Cl.
CPC .. *H02P 6/20* (2013.01); *H02P 6/14* (2013.01); *H02P 23/0027* (2013.01)

(58) Field of Classification Search
CPC ......... H02P 23/0027; H02P 6/20; H02P 6/14; H02K 21/26
See application file for complete search history.

(56) References Cited

U.S. PATENT DOCUMENTS

2008/0252242 A1   10/2008  Akama et al.
2013/0063104 A1*   3/2013  Gibson ......................... 323/271

FOREIGN PATENT DOCUMENTS

JP         2008-148379          6/2008

* cited by examiner

*Primary Examiner* — Karen Masih
(74) *Attorney, Agent, or Firm* — Fish & Richardson P.C.

(57) ABSTRACT

A motor drive apparatus comprises: a position signal generation portion that generates a position signal corresponding to a rotor position of a brushless DC motor; and a logic portion that when starting the brushless DC motor, disposes a non-energizing period immediately after starting forced commutation at a phase switchover timing corresponding to a predetermined forced commutation frequency and performs energizing control of the brushless DC motor such that usual commutation is started at a phase switchover timing corresponding to the position signal that is generated during an inertial rotation of the rotor.

13 Claims, 7 Drawing Sheets

MOTOR DRIVE APPARATUS

CROSS-REFERENCE TO RELATED APPLICATIONS

This application is based on the following Japanese Patent Application, and the contents of which are hereby incorporated by reference:

(1) Japanese Patent Application No. 2012-280987 (the filing date: Dec. 25, 2012)

BACKGROUND OF THE INVENTION

1. Field of the Invention

The present invention relates to a motor drive apparatus that performs drive control of a brushless DC motor.

2. Description of Related Art

As energizing methods for a brushless DC motor, a 120° energizing method and a 180° energizing method are common. The 180° energizing method is excellent in quietness compared with the 120° energizing method, however, requires generation of a drive waveform, and its circuit configuration becomes complicated compared with the 120° energizing method. Besides, when starting the brushless DC motor by means of the 180° energizing method, it is necessary to start rotation of the rotor irrespective of a rotor position by means of some approach and to switch to energizing control in accordance with the rotor position on the way.

For example, when starting a brushless DC motor that has many poles (12 poles or 16 poles), a method is commonly employed, in which the rotor is forcibly started to rotate by means of an energizing signal that has a predetermined magnetization pattern (forced commutation pattern) and switched to the 180° energizing control on the way.

In the meantime, as an example of a conventional technology relevant to the above description, there is JP-A-2008-148379.

On the other hand, in a case where the above forced commutation method is employed as an approach for starting a brushless DC motor that has a small number of poles (2 poles or 4 poles), there are problems: (1) difficult matching of a forced commutation frequency; (2) a defective start occurring because of a rotation ripple during a forced commutation period; and (3) a large noise caused by the rotation ripple during the forced commutation period.

Therefore, as the approach for starting the brushless DC motor that has the small number of poles, the above forced commutation method is not employed, but a method is employed, in which the rotor is started to rotate by means of the 120° energizing method, which is switched to the 180° energizing control on the way. However, in the case where the method is employed, there is a problem that a noise (motor start noise) is large when rotating the motor by means of the 120° energizing method.

SUMMARY OF THE INVENTION

In light of the above problems found by the inventors of the present application, it is an object of the present invention to provide a motor drive apparatus capable of starting a brushless motor quietly and smoothly.

To achieve the above object, a motor drive apparatus according to the present invention has a structure that includes: a position signal generation portion that generates a position signal in accordance with a rotor position of a brushless DC motor; and a logic portion that when starting the brushless DC motor, disposes a non-energizing period immediately after starting forced commutation at a phase switchover timing corresponding to a predetermined forced commutation frequency and performs energizing control of the brushless DC motor such that usual commutation is started at a phase switchover timing corresponding to the position signal that is generated during an inertial rotation of the rotor.

In the meantime, other features, elements, steps, advantages, and characteristics of the present invention will become more apparent from the following detailed description of preferred embodiments and the relevant attached drawings.

DETAILED DESCRIPTION OF PREFERRED EMBODIMENTS

<Block Diagram>

Figure 1:
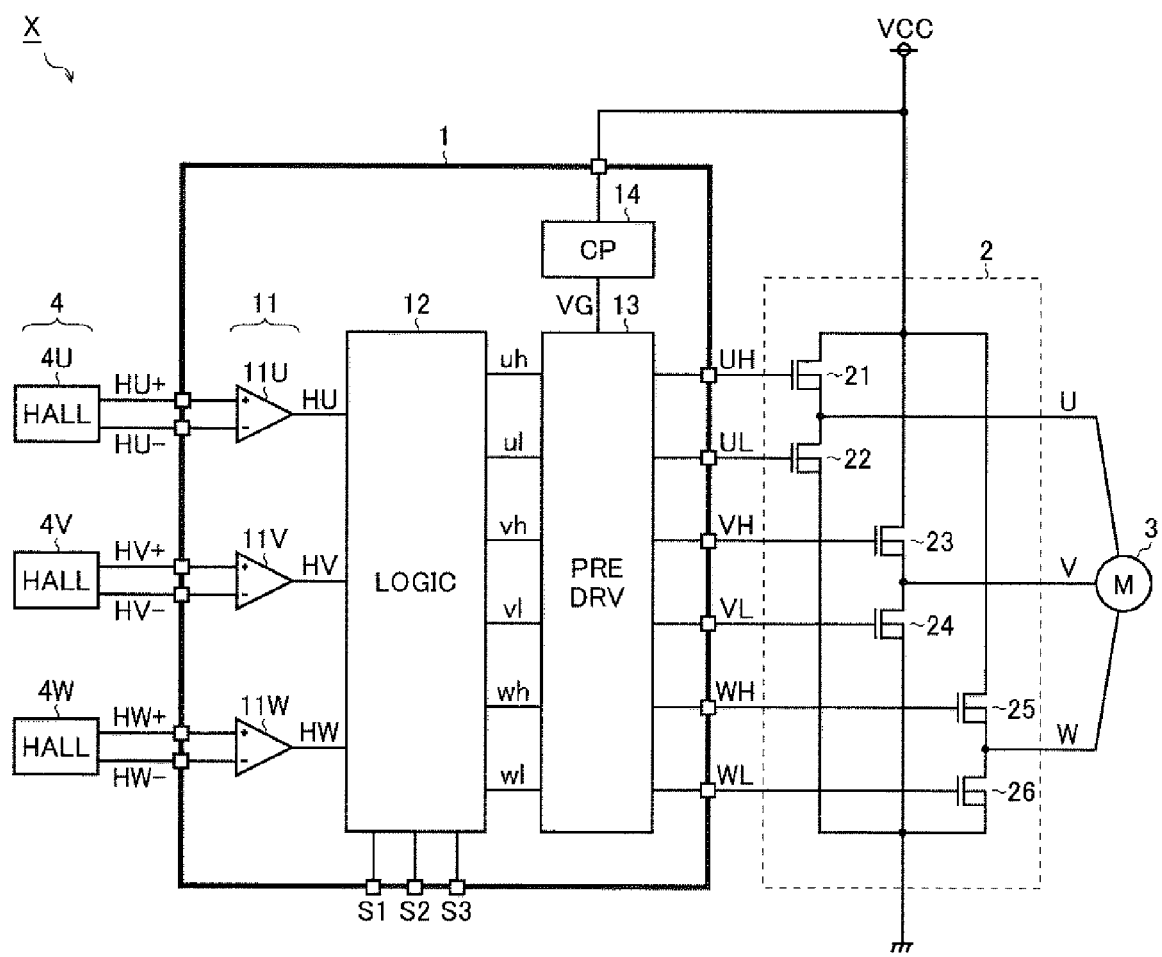
[FIG. 1] is a block diagram showing a structural example of an electronic apparatus.

FIG. 1 is a block diagram showing a structural example of an electronic apparatus that includes a 3-phase brushless DC motor. An electronic apparatus X in the present structural example has: a semiconductor apparatus 1; a driver 2; a 3-phase brushless DC motor 3 (hereinafter, simply called a motor 3); and a Hall sensor 4.

The semiconductor apparatus 1 is a motor drive apparatus (so-called motor driver IC) that performs drive control of the motor 3, and has: a position signal generation portion 11; a logic portion 12; a pre-driver 13; and a charge pump 14.

The position signal generation portion 11 is a circuit block that generates position signals (HU, HV, HW) corresponding to rotor positions of the motor 3, and includes Hall comparators 11U, 11V, and 11W each having hysteresis that are disposed for respective phases (U phase, V phase, W phase) of the motor 3. The Hall comparators 11U, 11V, and 11W apply differential amplification to positive- and negative-polarity Hall signals (HU+/HU−, HV+/HV−, HW+/HW−) input from respective Hall sensors 4U, 4V, and 4W, thereby generating the above position signals (HU, HV, HW).

The logic portion 12 generates, as its basic operation, pre-driver drive signals (uh/ul, vh/vl, wh/wl) for the respective phases and performs the 180° energizing control to fulfill commutation at phase switchover timings corresponding to the position signals (HU, HV, HW). Besides, the logic portion 12 applies PWM [pulse width modulation] control to each-phase pre-driver drive signal to change a rotation speed of the motor 3 in accordance with a rotation speed control signal S1 that is input from outside. In the meantime, the logic portion 12 can accept inputs of an analog voltage and pulse width modulation signal as the rotation speed control signal S1. Besides, the logic portion 12 applies variable controls to a forced commutation frequency (frequency of the forced commutation that is performed at a start time of the motor 3) in accordance with a forced commutation frequency control signal S2. Besides, the logic portion 12 applies the variable control to a forced commutation period (the number of energizing patterns during the forced commutation) in accordance with a forced commutation period control signal S3.

In the meantime, the logic portion 12 can start the motor 3 quietly and smoothly by means of a new motor drive sequence. This point is described in detail later.

The pre-driver 13 applies predetermined signal processes (level shifting process, waveform shaping process and the like) to each-phase pre-driver drive signal (uh/ul, vh/vl, wh/wl) input from the logic portion 12 to generate each-phase driver drive signal (UH/UL, VH/VL, WH/WL) and outputs them to the external driver 2.

The charge pump 14 generates a stepped-up voltage VG (pre-driver power supply voltage) from a power supply voltage VCC and outputs this to the pre-driver 13.

In the meantime, the semiconductor apparatus 1 integrates, besides the above components, an internal reference voltage generation portion; a standby control portion; an advanced ignition control portion; a soft start control portion; a reference clock oscillator; a carrier frequency oscillator; various protection portions (overvoltage protection portion, overcurrent protection portion, temperature protection portion, lock protection portion and the like); however, detailed description is skipped here.

The driver 2 is a power output stage that generates each-phase energizing signal (U, V, W) in accordance with each-phase driver drive signal (UH/UL, VH/VL, WH/WL) and includes power transistors 21-26 (MOSFET [metal oxide semiconductor field effect transistor], IGBT [insulated gate bipolar transistor] and the like). Drains of upper power transistors 21, 23, 25 are all connected to an application terminal for the power supply voltage VCC. Sources and back gates of the upper power transistors 21, 23, 25 and drains of lower power transistors 22, 24, 26 are connected to respective phase terminals of the motor 3. Sources and back gates of the lower power transistors 22, 24, 26 are all connected to a ground terminal. In the meantime, as all the power transistors 21-26, an N channel type is used; however, as the upper power transistors 21, 23, 25, a P channel also is usable. In this case, the charge pump 14 of the semiconductor apparatus 1 is removable.

Figure 2:
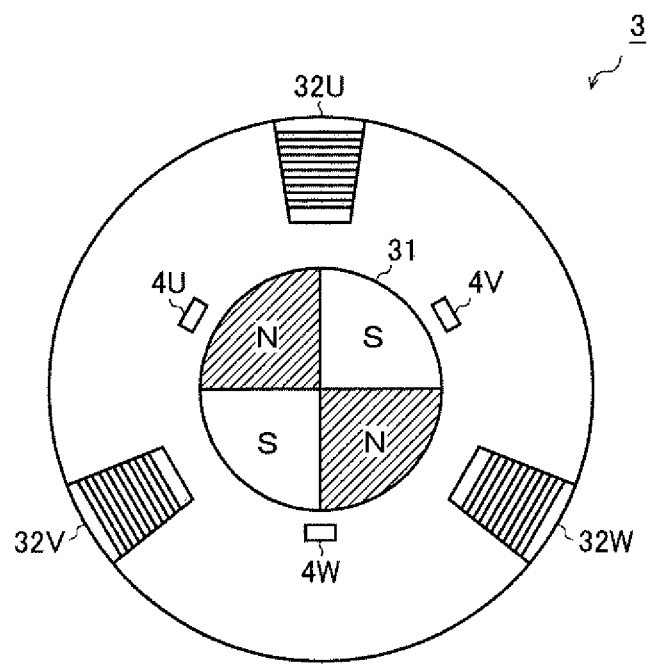
[FIG. 2] is a schematic diagram showing an internal structure of a motor 3.

As shown in FIG. 2, the motor 3 has a structure which includes a rotor 31 that has a O-pole permanent magnet; and 3-slot stators 32U, 32V, 32W each of which is wound by a coil. In the meantime, a combination of the number of poles and the number of slots is not limited to 4-pole-3-slot, but other combinations (2-pole-3-slot, 4-pole-6-slot and the like) also are employable. Especially, in a case where a brushless DC motor having a small number of poles (2 poles, 4 poles and the like) is used as the motor 3, a motor start sequence described later functions effectively to raise quietness and smoothness at the motor start. However, there is no problem with using a brushless DC motor having a large number of poles (12 poles, 16 poles and the like).

As shown in FIG. 2, the Hall sensor 4 includes phase Hall sensors 4U, 4V, 4W disposed at positions where to have the same phase in electrical angle as the respective phase stators 32U, 32V, 32W, detects a magnetic field of the rotor 31 to generate an analog voltage signal (Hall signal). In the meantime, instead of the Hall sensor 4, it is possible to use a Hall IC that generates a rectangular waveform signal. In this case, the Hall comparators 11U, 11V, 11W of the semiconductor apparatus 1 are removable. However, to deal with external connection of both the Hall sensor and the Hall IC it is desirable to disposes the Hall comparators 11U, 11V, 11W in the semiconductor apparatus 1.

<180° Energizing Control>

Figure 3:
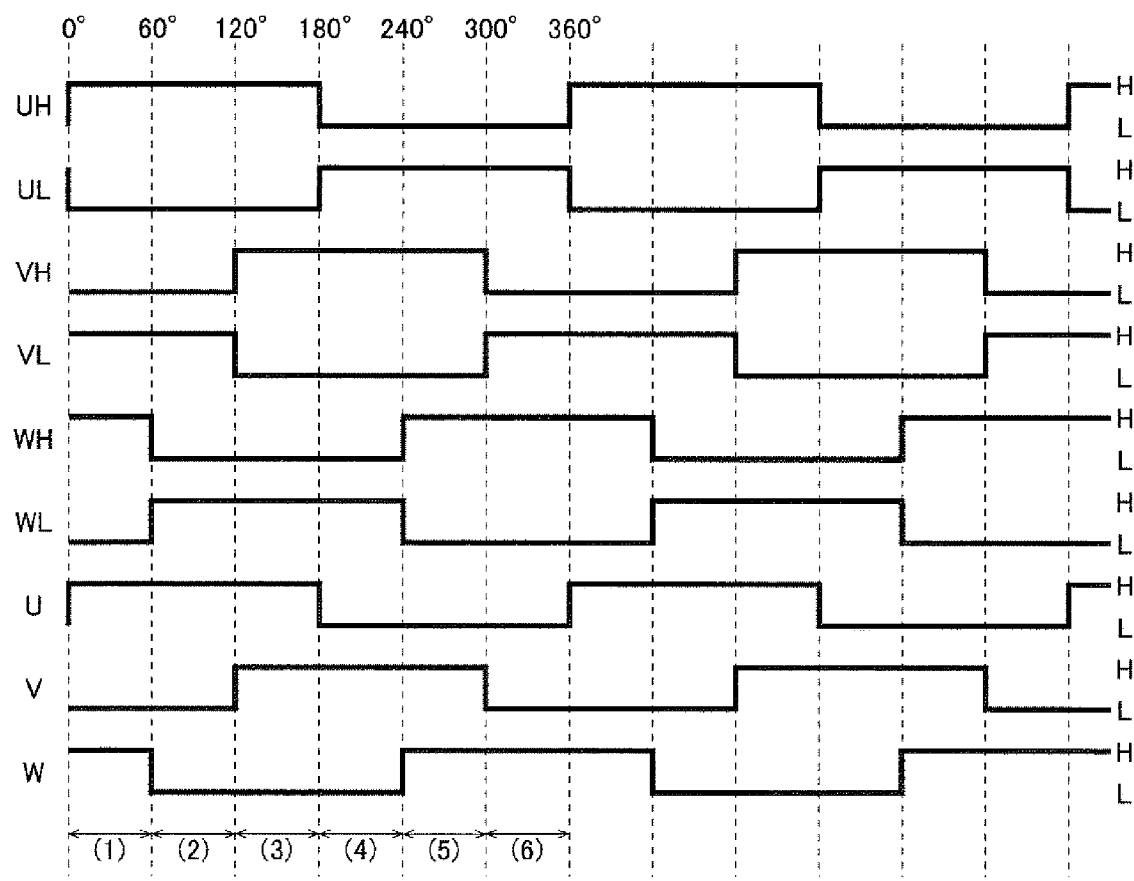
[FIG. 3] is a time chart showing behavior of a driver drive signal and an energizing signal.
Figure 4:
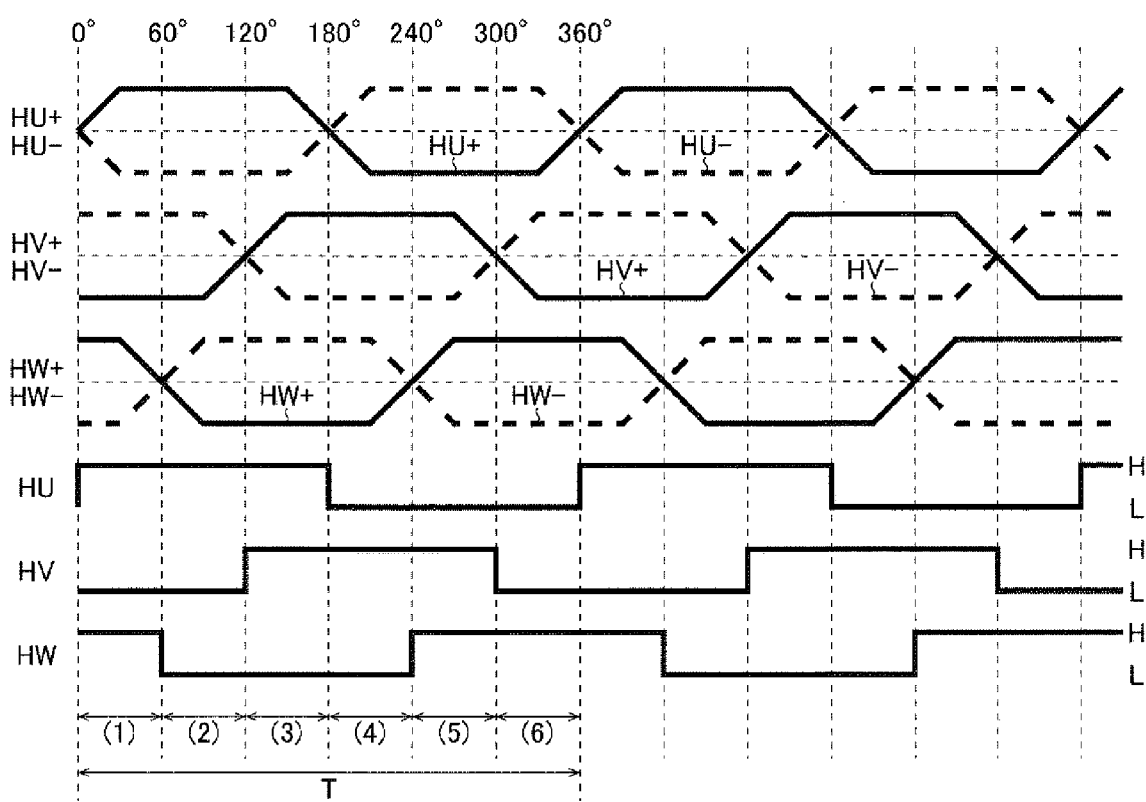
[FIG. 4] is a time chart showing behavior of a Hall signal and a position signal.

FIG. 3 is a time chart showing behavior of the driver drive signals (UH/UL, VH/VL, WH/WL) and energizing signals (U, V, W) during a 180° energizing period. Besides, FIG. 4 is a time chart showing behavior of the Hall signals (HU+/HU−, HV+/HV−, HW+/HW−) and positions signals (HU, HV, HW) during the 180° energizing period.

In an electrical angle range of 0° to 60° (phase (1)), the driver drive signals UH, VL, WH are brought to a high level and the driver drive signals UL, VH, WL are brought to a low level; accordingly, the power transistors 21, 24, 25 are turned on and the power transistors 22, 23, 26 are turned off. As a result of this, the energizing signals U, W go to a high level and the energizing signal V goes to a low level; accordingly, a drive current flows in the motor 3 from the U phase and W phase terminals to the V phase terminal. At this time, the position signals HU, HW go to a high level and the position signal HV goes to a low level.

In an electrical angle range of 60° to 120° (phase (2)), the driver drive signals UH, VL, WL are brought to the high level and the driver drive signals UL, VH, WH are brought to the low level; accordingly, the power transistors 21, 24, 26 are turned on and the power transistors 22, 23, 25 are turned off. As a result of this, the energizing signal U goes to the high level and the energizing signals V, W go to the low level; accordingly, a drive current flows in the motor 3 from the U phase to the V phase and W phase. At this time, the position signal HU goes to the high level and the position signals HV, HW go to the low level.

In an electrical angle range of 120° to 180° (phase (3)), the driver drive signals UH, VH, WL are brought to the high level and the driver drive signals UL, VL, WH are brought to the low level; accordingly, the power transistors 21, 23, 26 are turned on and the power transistors 22, 24, 25 are turned off. As a result of this, the energizing signals U, V go to the high level and the energizing signal W goes to the low level; accordingly, a drive current flows in the motor 3 from the U phase and V phase to the W phase. At this time, the position signals HU, HV go to the high level and the position signal HW goes to the low level.

In an electrical angle range of 180° to 240° (phase (4)), the driver drive signals UL, VH, WL are brought to the high level and the driver drive signals UH, VL, WH are brought to the low level; accordingly, the power transistors 22, 23, 26 are turned on and the power transistors 21, 24, 25 are turned off. As a result of this, the energizing signal V goes to the high level and the energizing signals U, W go to the low level; accordingly, a drive current flows in the motor 3 from the V phase to the U phase and W phase. At this time, the position signal HV goes to the high level and the position signals HU, HW go to the low level.

In an electrical angle range of 240° to 300° (phase (5)), the driver drive signals UL, VH, WH are brought to the high level and the driver drive signals UH, VL, WL are brought to the low level; accordingly, the power transistors 22, 23, 25 are turned on and the power transistors 21, 24, 26 are turned off. As a result of this, the energizing signals V, W go to the high level and the energizing signal U goes to the low level; accordingly, a drive current flows in the motor 3 from the V phase and W phase to the U phase. At this time, the position signals HV, HW go to the high level and the position signal HU goes to the low level.

In an electrical angle range of 300° to 360° (phase (6)), the driver drive signals UL, VL, WH are brought to the high level and the driver drive signals UH, VH, WL are brought to the low level; accordingly, the power transistors 22, 24, 25 are turned on and the power transistors 21, 23, 26 are turned off. As a result of this, the energizing signal W goes to the high level and the energizing signals U, V go to the low level; accordingly, a drive current flows in the motor 3 from the W phase to the U phase and V phase. At this time, the position signal HW goes to the high level and the position signals HU, HV go to the low level.

As described above, in the 180° energizing method, the logic levels of the energizing signals (U, V, W) are switched every 180° with the phases deviated 120° from each other. For the sake of simple illustration, FIG. 3 and FIG. 4 draw the upper driver drive signals UH, VH, WH and the lower driver drive signals UL, VL, WL as signals opposite to each other in logic; however, as a matter of fact, for the purpose of preventing a through-current, a predetermined dead period (concurrent off-period of the upper and lower power transistors) is disposed such that the lower driver drive signals UL, VL, WL go to the high level after the upper driver drive signals UH, VH, WH go the low level, or the upper driver drive signals UH, VH, WH go to the high level after the lower driver drive signals UL, VL, WL go to the low level.

<Motor Start Sequence>

Figure 5:
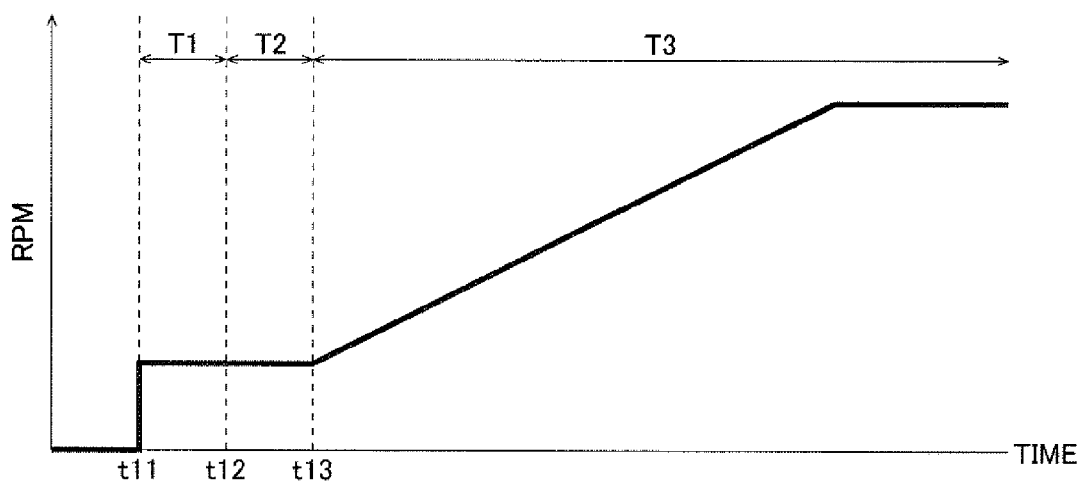
[FIG. 5] is a time chart showing an example of a motor start sequence.

FIG. 5 is a time chart showing an example of a motor start sequence by the logic portion 12; the vertical axis indicates the number of rotations of the motor 3, while the lateral axis indicates the time.

When starting the motor 3, the logic portion 12 performs the 180° energizing control of the motor 3 to shift from a forced commutation period T1 to a usual commutation period T3 via a non-energizing period T2.

First, during the forced commutation period T1 (time points t11 to t12), the logic portion 12 detects an initial position of the rotor 31 based on the position signals (HU, HV, HW) generated during a stop of the rotor 31, and performs the 180° energizing control of the motor 3 to start the forced commutation of the motor 3 by means of an energizing pattern corresponding to the initial position.

For example, a case where a logic pattern of the position signals (HU, HV, HW) generated during the stop of the rotor 31 is (H, L, H) corresponds to the phase (1) in FIG. 3 and FIG. 4; accordingly, the logic portion 12 switches successively the energizing pattern of the driver drive signals (UH/UL, VH/VL, WH/WL) at a phase switchover timing corresponding to a predetermined forced commutation frequency, thereby performing the forced commutation of the motor 3.

Figure 6:
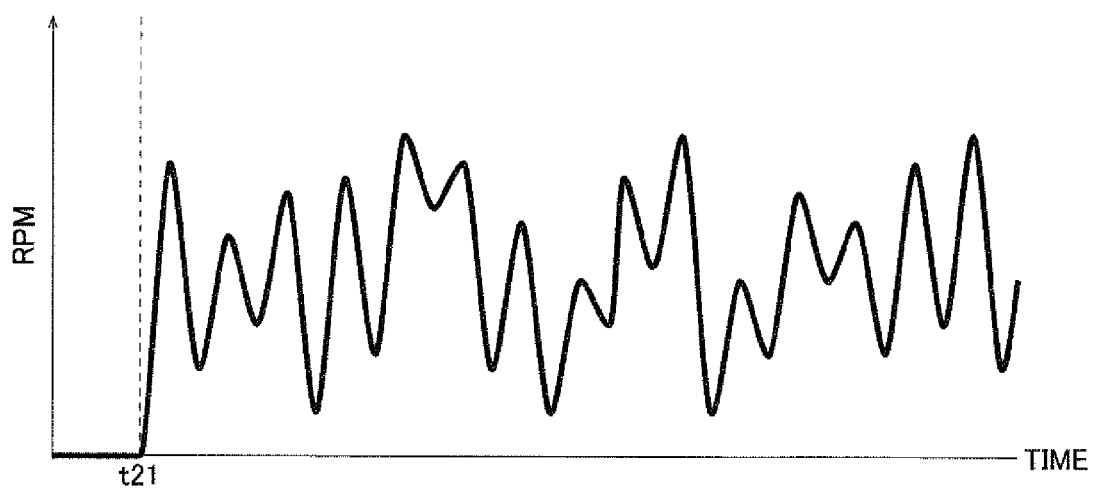
[FIG. 6] is a time chart showing rotation behavior during a defective start period.

In the meantime, in the conventional motor start sequence, the forced commutation control is continued until the rotation speed of the motor reaches a predetermined value; thereafter, the switchover to the 180° energizing control is performed. Because of this, if the forced commutation frequency is not matched in accordance with a motor characteristic, there is a risk that a noise and defective start of the motor occur (see FIG. 6).

On the other hand, in the motor start sequence proposed this time, the forced commutation of the motor 3 performed during the forced commutation period T1 is not intended to continuously rotate the motor 3, but intended to generate a state in which some rotation force is given to the rotor 31 to periodically change the position signals (HU, HV, HW) in accordance with the rotor position.

Accordingly, in the motor start sequence proposed this time, the forced commutation period T1 is set at a very short period (preferably a period shorter than one period (360°) of the electrical angle), and the forced commutation of the motor 3 is ended immediately after the start of the forced commutation.

In the meantime, the length of the forced commutation period T1 is arbitrarily adjustable by using the forced commutation period control signal S3. Besides, also the forced commutation frequency is arbitrarily adjustable by using the forced commutation frequency control signal S2. However, as described above, the forced commutation of the motor 3 performed during the forced commutation period T1 is not intended to continuously rotate the motor 3; accordingly, it is not necessary to strictly perform the matching of the forced commutation frequency.

After the forced commutation period T1 elapses, during the non-energizing period T2 (time points t12 to t13), the logic portion 12 stops the forced commutation of the motor 3 to make the rotor rotate 31 inertially. During the period during which the rotor 31 continues to rotate inertially, the position signs (HU, HV, HW) periodically change in accordance with the rotor position.

In the meantime, a period (pulse period), which extends from a time when a pulse edge occurs in the first-phase position signal of the 3-phase position signals (HU, HV, HW) to a time when a pulse edge occurs in the second position signal, corresponds to ⅙ of the Hall period T. Accordingly, if the pulse period of the position signals (HU, HV, HW) is detected, it is possible to calculate the Hall period backwards.

For example, in a case where the non-energizing period T2 is started immediately before a rising edge of the position signal HU, to detect the Hall period, a period from the rising edge of the position signal HU to a falling edge of the position signal HW is counted. Accordingly, it is sufficient if the non-energizing period T2 continues from a time immediately before the rising edge of the position signal HU to a time immediately after the falling edge of the position signal HW.

On the other hand, in a case where the non-energizing period T2 is started immediately after the rising edge of the position signal HU, to detect the Hall period, a period from a falling edge of the position signal HW to a rising edge of the position signal HV is counted. Accordingly, it is necessary for the non-energizing period T2 to continue from a time immediately after the rising edge of the position signal HU to a time immediately after the rising edge of the position signal HV.

In light of the above description, it is understood that the non-energizing period T2 necessary for detecting the Hall period based on the 3 phase position signals (HU, HV, HW) changes in a range of $T/6<T2<T/3$. On the other hand, in a case where the Hall period T is detected based on one phase position signal of the 3 phase position signals (HU, HV, HW), the non-energizing period T2 changes in a range of $T/2<T2<T$. As the non-energizing period T2 becomes shorter, the rotation speed of the rotor 3 becomes less likely to decline; accordingly, to detect the Hall period, it is desirable to use all of the 3 phase position signals (HU, HV, HW).

Thereafter, at a time point when the pulse period T of the position signal (HU, HV, HW) is detected, the logic portion 12 shifts from the non-energizing period T2 to the usual commutation period T3 (the time point t13-) and performs the 180° energizing control of the motor 3 to start the usual commutation at a phase switchover timing corresponding to the above pulse period T. And, also after the time point t13, the logic portion 12 updates the pulse period T of the position signals (HU, HV, HW) at every electrical angle of 60°, and continues the 180° energizing control of the motor 3 to perform the commutation at a phase switchover timing corresponding to the latest pulse period T.

As described above, when starting the motor 3, the logic portion 12 disposes the non-energizing period immediately after the forced commutation is started at the phase switchover timing corresponding to the predetermined forced commutation frequency, and performs the energizing control of the brushless DC motor 3 to start the usual commutation at the phase switchover timing corresponding to the position signals (HU, HV, HW) that are generated during the inertial rotation of the rotor 31.

According to such motor start sequence, it is possible to solve the noise and defective start caused by the forced commutation; accordingly, it becomes possible to start the motor 3 having a small number of poles quietly and smoothly.

<Application to Vehicle>

Figure 7:
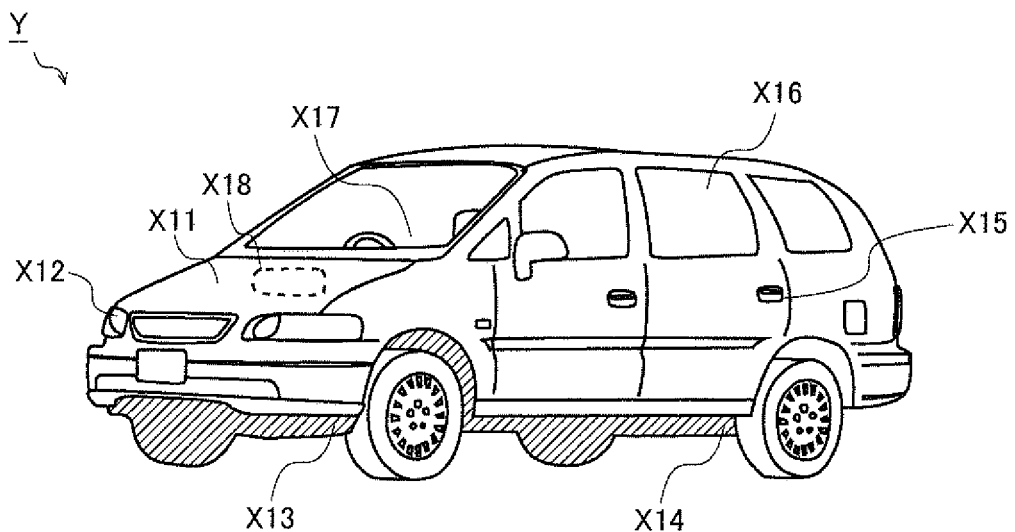
[FIG. 7] is an appearance view showing a structural example of a vehicle that incorporates an electronic apparatus.

FIG. 7 is an appearance view showing a structural example of a vehicle that incorporates various electronic apparatuses. A vehicle Y in the present structural example incorporates various electronic apparatuses X11 to X18 that is supplied with the power supply voltage VCC from a battery (not shown) to operate. In the meantime, for the sake of illustration, there is a case where incorporation positions of the electronic apparatuses X11 to X18 are different from accrual positions.

The electronic apparatus X11 is an engine control unit that performs control (injection control, electronic throttle control, idling control, oxygen sensor heater control, auto-cruise control and the like) related to an engine.

The electronic apparatus X12 is a lamp control unit that performs on/off control of an HID [high intensity discharged lamp], a DRL [daytime running lamp] and the like.

The electronic apparatus X13 is a transmission control unit that performs control related to transmission.

The electronic apparatus X14 is a body control unit that performs control (ABS [anti-lock brake system] control, EPS [electric power steering] control, electronic suspension control and the like) related to movement of the vehicle Y.

The electronic apparatus X15 is a security control unit that performs drive control of a door lock, a security alarm and the like.

The electronic apparatus X16 is an electronic apparatus such as an air conditioner, a wiper, an electric door mirror, a power window, a damper (shock absorber), an electric sun roof, an electric sheet or the like that is built in the vehicle Y in a factory shipment stage as a standard product or a maker option.

The electronic apparatus X17 is an electronic apparatus such as a vehicle A/V [audio/visual] apparatus, a car navigation system, an ETC [electronic toll collection system] or the like that is mounted arbitrarily in the vehicle Y as a user option.

The electronic apparatus X18 is an electronic apparatus that includes a high-pressure-resistant motor for a vehicle blower, a water pump, a battery cooling fan and the like.

Of the above-described electronic apparatuses X11 to X18, as to an electronic apparatus that includes a brushless DC motor, it is possible to suitably employ the structure and motor start method of the electronic apparatus X described above. Especially, in an electric car that produces no engine sound or an idling stop vehicle that stops the engine during a vehicle stop period, even a motor start sound released from an electronic apparatus incorporated in the vehicle is likely to grate on the driver or a passenger; however, the electronic apparatus X described above can start the brushless DC motor quietly and smoothly; accordingly, it becomes possible to keep the vehicle room quiet.

<Other Variations>

In the meantime, the various technological features disclosed in the present specification are able to be modified in various ways without departing from the spirit of the technological creation besides the above embodiment. For example, as to use of the motor drive apparatus, besides vehicles, various uses (e.g., white home appliances) are conceivable. In addition, as to the motor energizing method excellent in quietness, besides the 180° energizing method, the 150° energizing method and the like are conceivable. In addition, as to the rotor position detection approach, besides the approach that uses a Hall sensor or a Hall IC, an approach which monitors an induced voltage occurring in a motor coil is conceivable.

As described above, it should be considered that the above embodiments are examples in all respects and are not limiting, and it should be understood that the technological scope of the present invention is not indicated by the above description of the embodiments but by the claims, and all modifications within the scope of the claims and the meaning equivalent to the claims are covered.

INDUSTRIAL APPLICABILITY

The present invention is a technology applicable to all motor drive apparatuses and usable for a vehicular 3-phase brushless DC motor driver IC, for example.

LIST OF REFERENCE NUMERALS 1 semiconductor apparatus (motor drive apparatus)
11 position signal generation portion
11U, 11V, 11W Hall comparators
12 logic portion
13 pre-driver
14 charge pump
2 driver
21 to 26 power transistors
3 motor (3-phase brushless DC motor)
31 rotor
32U, 32V, 32W stators
4, 4U, 4V, 4W Hall sensors
X, X11 to X18 electronic apparatuses
Y vehicle

What is claimed is:

1. A motor drive apparatus comprising:
a position signal generation portion that generates a position signal corresponding to a rotor position of a brushless DC motor; and
a logic portion that when starting the brushless DC motor, disposes a non-energizing period immediately after starting forced commutation at a phase switchover timing corresponding to a predetermined forced commutation frequency and performs energizing control of the brushless DC motor such that usual commutation is started at a phase switchover timing corresponding to the position signal that is generated during an inertial rotation of the rotor.

2. The motor drive apparatus according to claim 1, wherein the logic portion performs 180° energizing control or 150° energizing control of the brushless DC motor.

3. The motor drive apparatus according to claim 2, wherein the logic portion performs the energizing control of the brushless DC motor to shift from the non-energizing period to a usual commutation period at a time point when a pulse period of the position signal generated during the inertial rotation of the rotor is detected after shifting from a forced commutation period to the non-energizing period.

4. The motor drive apparatus according to claim 3, wherein the logic portion performs the energizing control of the brushless DC motor to start the forced commutation by means of an energizing pattern corresponding to the position signal generated during a stop of the rotor.

5. The motor drive apparatus according to claim 4, wherein the logic portion applies variable control to the forced commutation period.

6. The motor drive apparatus according to claim 4, wherein the logic portion applies variable control to the forced commutation frequency.

7. The motor drive apparatus according to claim 5, wherein the logic portion applies variable control to the forced commutation frequency.

8. The motor drive apparatus according to claim 1, wherein the position signal generation portion receives an input of a Hall signal from a Hall sensor or a Hall IC to generate the position signal.

9. The motor drive apparatus according to claim 1, wherein the position signal generation portion monitors an induced voltage occurring in a motor coil to generate the position signal.

10. An electronic apparatus comprising:
a brushless DC motor; and
the motor drive apparatus of claim 1 that performs drive control of the brushless DC motor.

11. The electronic apparatus according to claim 10, wherein
a rotor of the brushless DC motor has two or four poles.

12. A vehicle comprising the electronic apparatus of claim 10.

13. A vehicle comprising the electronic apparatus of claim 11.

* * * * *